United States Patent [19]

Riggs et al.

[11] 4,395,299
[45] Jul. 26, 1983

[54] BONDED BULK GRAPHITE AND PROCESS FOR BONDING

[75] Inventors: Dennis M. Riggs, Simpsonville, S.C.; Edward L. Harvey, Watertown, Mass.

[73] Assignee: The United States of America as represented by the Secretary of the Army, Washington, D.C.

[21] Appl. No.: 295,167

[22] Filed: Aug. 21, 1981

[51] Int. Cl.³ .............................................. C09J 3/30
[52] U.S. Cl. ..................... 156/285; 156/337; 264/29.5; 427/228; 428/408
[58] Field of Search ............... 156/285, 337, 155; 264/29.5, 29.7; 428/408; 427/226, 228; 423/448

[56] References Cited

U.S. PATENT DOCUMENTS

| | | | |
|---|---|---|---|
| 3,239,403 | 3/1966 | Williams et al. | 428/408 |
| 3,275,488 | 9/1966 | Bailey et al. | 156/337 |
| 3,573,086 | 3/1971 | Lambdin, Jr. | 428/408 |
| 3,616,045 | 10/1971 | Kozar et al. | 156/155 |
| 3,682,686 | 8/1972 | Nakamura et al. | 428/408 |
| 4,208,267 | 6/1980 | Diefendor et al. | 208/22 |
| 4,226,900 | 10/1980 | Carlson et al. | 264/29.5 |
| 4,279,952 | 7/1981 | Kodama et al. | 156/155 |

FOREIGN PATENT DOCUMENTS

| | | | |
|---|---|---|---|
| 744260 | 9/1970 | Belgium | 428/408 |
| 1107578 | 5/1961 | Fed. Rep. of Germany | 156/337 |
| 1406554 | 6/1965 | France | 156/155 |
| 116653 | 1/1959 | U.S.S.R. | 156/155 |

*Primary Examiner*—Edward C. Kimlin
*Assistant Examiner*—F. K. Wine
*Attorney, Agent, or Firm*—Robert P. Gibson; Anthony T. Lane; Lawrence E. Labadini

[57] ABSTRACT

Bulk pieces of graphite bonded with a graphitizable binder comprising a liquid crystalline component of pitch, which softens at about 240° C. and becomes very fluid at about 300° C. to about 500° C. The bonded graphite pieces appear as a monolithic material even under 1000× magnification. The bonding is effected under vacuum or in an inert atmosphere at temperatures of from about 700° C. to about 3000° C., usually about 1000° C. to about 1500° C., under pressure of from about 20 psi to about 1000 psi applied in a direction normal to the bonding surface.

5 Claims, No Drawings

BONDED BULK GRAPHITE AND PROCESS FOR BONDING

BACKGROUND OF THE INVENTION

The invention described herein may be manufactured, used, and licensed by or for the government without the payment to the inventors of any royalty thereon.

This invention relates to bonded bulk graphite pieces which have been bonded with a graphitizable binder comprising a special liquid crystalline component of pitch, which softens at about 240° C. and becomes very fluid at about 300° C. to about 500° C. This pitch has itself been obtained from pitch as described in U.S. Pat. No. 4,208,267 awarded to D. M. Riggs and R. J. Diefendorf. This invention also encompasses the process for bonding graphite pieces with the specified binder. The terms "liquid crystalline", "liquid crystal" and pseudocrystalline" as used herein refer to the molecular structure of the molecules of the binding material. Apparently the molecules, in the liquid state, are preferentially stacked in a layered arrangement as if they were "crystals." It is thought that the epitaxial growth from one graphite piece to the other, through the binder, is because of this preferential stacking of molecules.

Precision made graphite pieces find many mechanical and structural uses, especially where the parts formed must retain their form, shape and characteristics under extreme temperatures and pressures, such as the aerospace industry. Examples of the application in which precision made graphite parts find use are rocket motor nozzle inserts, nose tips for reentry vehicles, nuclear reactor component parts for nuclear processing equipment, molds and dies for continuous casting of nonferrous metals, molds for direct chill casting, molds for diamond core bits, molds and plungers for hot pressing of divers materials, resistance heating elements, susceptors for high temperature furnaces and the like.

Prior to the present invention such pieces had to be machined from a single piece of graphite because of the inability to reliably and precisely bond graphite pieces. The machining of graphite pieces is expensive, tedious, time consuming and difficult, especially when large pieces, such as rocket nozzles, were being made. It was not uncommon for the graphite, because of their brittleness, to fracture during processing thus requiring expensive handling precautions during the processing.

By the utilization of the present invention it is now possible to bond, reliably and precisely, smaller graphite pieces to form the large units thus greatly reducing the expensive machining operation. Utilizing the bonding process of this invention, it should also be possible to repair graphite pieces thus eliminating expensive new fabrication.

BRIEF SUMMARY OF THE INVENTION

According to the present invention, graphite pieces are bonded with a graphitizable, liquid crystalline fraction obtained by extracting a commercially available isotropic pitch with one or more hydrocarbon solvents as more particularly described in the aforementioned U.S. Pat. No. 4,208,267, of Riggs and Diefendorf, disclosure of which is incorporated herein by reference. When the surfaces of the graphite pieces, to be bonded together, are coated with this pitch fraction and assembled, and the assembly is subjected to carbonizing temperatures, a stable and reliable bond is formed. The assembly appears monolithic, even when the bonded interface is viewed under 100× magnification under plane and polarized light, in that the bonded interface region is indistinguishable from the starting pieces of graphite.

The bonding process is conducted under vacuum or inert atmosphere conditions at temperatures of from about 700° C. to 3000° C. under a pressure load of about 20 psi to about 1000 psi applied in a direction normal to the bonding surface.

DETAILED DESCRIPTION OF THE INVENTION

U.S. Pat. No. 4,208,267 of Riggs and Diefendorf, incorporated herein by reference, describes and claims the process for obtaining specified pitches by extraction of crude pitch with at least one of certain specified hydrocarbon solvents and teaches a method for making carbonaceous fibers therefrom. Riggs and Diefendorf, in said patent, did not recognize the pseudocrystallinity or liquid crystallinity of the extracted pitch nor its use to bond graphite which is the subject matter of the present invention.

According to the present invention, the same component, which softens at about 240° C. and becomes very fluid at about 300° C. to about 500° C., has been found to be a suitable bonding agent for graphite thus rendering it possible to machine small graphite pieces to precise dimensions and shapes required of precision parts and then bond them together to form large structures. These bonded graphite structures are stable and reliably bonded. Following bonding, according to the process of the present invention, the bond interface is indistinguishable from the surrounding graphite even at magnifications of up to 1000× under both plane and polarized light. This phenomenon suggests that the binder, during the carbonization step by which the bonding is effected, epitaxially grows the same crystal structure as the surrounding graphite. At least partial confirmation of this hypothesis has been obtained by varying the temperature of heat treatment and observing that the degree of graphitic crystalline order developed at the bond interface varies concomitantly. It has also been hypothesized that the preferential stacking of molecules, in the liquid crystal, assists the epitaxial growth.

While the liquid crystalline binder may be prepared with any of the hydrocarbon solvents or solvent combinations disclosed in the aforementioned U.S. Pat. No. 4,208,267, is it preferred that the pitch be first extracted with normal heptane followed by a second extraction utilizing benzene. In the heptane extraction the crude pitch is ground and then mixed with heptane, at least about 6 ml of heptane per gram of pitch, and the mixture stirred for several hours, filtered and the insolubles dried. The residue is then added to benzene, at least about 60 ml benzene per gram of solid, and the mixture once again stirred for several hours and the mixture filtered. It is this benzene insoluble portion which is the binder utilized in the present invention.

To achieve appropriate bonding the binder must be uniformly coated over the surface of at least one of the two graphite interfacial surfaces. Preferably, the processed pitch fraction constituting the binder is coated uniformly to a thickness in the order of about 1/16 inch across the surface of one of the graphite pieces to be bonded, the pieces are joined and preferably wrapped to prevent seepage of binder before initiating heating. Bonding takes place at elevated temperatures, in a vacuum or in an inert atmosphere, and preferably with pressure being applied to the graphite-binder-graphite assembly in a direction normal to the bonding surface.

The heat treatment step is carried out at temperatures of from about 700° C. to about 3000° C. but preferably in the range of about 1000° C. to 1500° C. It is preferred that this heating step be preceded by a heating step carried out at temperatures up to about 500° C. to about 550° C. over a period of about one to two hours. This initial heating step results in the evolution of hydrogen, nitrogen, oxygen and sulfur from the binding. The heating at these temperatures permits the gases to diffuse from the binder resulting in less porosity and thus better bonding. If the heating is too rapid, and especially if the temperature exceeds about 550° C. in too short a time period, the gases cannot diffuse from the binder thus resulting in a great amount of porosity and weak bonding. The conversion of liquid crystal to substantially a carbon does not occur until the graphite-binder-graphite assembly has been heated above about 550° C. In the present process the second heating step is preferably at a temperature range of about 1000° C. to about 1500° C. It is the conversion to carbon which gives the bond its crystal structure and mechanical properties.

The bonding process is usually carried out in a vacuum or alternatively in an inert atmosphere such as under a blanket of nitrogen or argon gas.

Preferably the graphite-binder-graphite assembly is subjected to a pressure during the heat treatment step. The pressure is applied to the assembly in a direction normal to the bonding surface and is in an amount of about 20 psi to about 1000 psi, with 200 psi being the preferred pressure. The pressure may be applied by ram pressure, vise pressure or the like.

Bond strengths of over 1220 psi, normal to the bonded interface, have been achieved by the bonding method of this invention even where the bonds actually occupied only about 30% of the common surfaces, the balance being pores produced during the heating step. The invention contemplates achievement of bond strengths of the same strength as the graphite itself under optimum heat treatment conditions where the bonds occupy about 95-100% of the common surfaces.

Tests utilizing unprocessed pitch produced no bonding. Other tests in which up to 10 weight percent of tantalum carbide was added to the processed pitch fraction produced a bond with a strength in the order of 60% or less than that of the bond strength attained with a uniform coating of the processed pitch faction alone.

The preferred graphites to be bonded, according to this invention, are the commercially available high strength, premium grades which are fine-grained and essentially free of flaws and have been specially developed for demanding mechanical and structural uses. Of these, a particularly preferred graphite has a total ash content of less than 0.20%, such ash typically containing 100 ppm or more of iron and sulfur, from about 50 ppm to about 100 ppm of calcium and aluminum and less than about 50 ppm of vanadium, titanium, boron, lithium and cadmium. Such graphites typically have an average density in the order of 1.74 g/cc., a maximum grain size of about 0.006 inches and other properties as shown in the ensuing table.

TABLE 1

| PROPERTY | UNITS | WITH GRAIN AVERAGE | ACROSS GRAIN AVERAGE |
|---|---|---|---|
| Tensile Strength (per ASTM565T) | lbs/sq. in. | 4000 | 3380 |
| Compressive Strength (per ASTMC109) | lbs/sq. in. | 8600 | 8800 |
| Flexural Strength (per ASTMC78) | lbs/sq. in. | 4310 | 3640 |
| Young's Modulus, Sonic Poisson Ration | $10^6$ lbs/sq. in. | 1.5 | 1.12 |
| (a) with grain/across grain | — | $0.10_{(vww)}$ | $0.11_{(vaw)}$ |
| (b) across grain/with grain | — | $0.16_{(vwa)}$ | — |
| Modulues of Rigidity (Shear Modulus) | $10^6$ lbs/sq. in. | 0.57 | 0.57 |
| Thermal Conductivity | BTU × ft/hr × sq. ft., °F. | 71 | 53 |
| Coefficient of Thermal Expansion | $10^{-6}$/°F. | 1.19 | 1.92 |
| Emissivity Reflectance | 2000-4000° F. | 0.97 | 0.97 |
| Permeability in $N_2$ at/atm | $10^{-4}$ ohm cm. | 10.5 | 14.3 |

One commercially available graphite which has the preferred properties is "UCAR" premium graphite grade ATJ sold by Carbon Products Division of Union Carbide Corp., 270 Park Avenue, New York, New York.

Notwithstanding the expressed preference for high strength premium quality graphites adapted to demanding structural and mechanical use requirements, it is understood that any crystalline or semi-crystalline graphite may be used in the processes and products of this invention. The invention is further illustrated by the following specific examples:

EXAMPLE 1

34 grams of Ashland Oil Co. A240 pitch and 2000 ml. of n-heptane were blended, using a magnetic stirrer, for about 24 hours. The mixture was drained through a nylon polishing cloth. The solvent was removed from the precipitate from the n-heptane extract and the dried precipitate was then blended with 2000 ml. of benzene, using a magnetic stirrer, for about 24 hours. The solution was strained through #40 Whatman filter paper and a crystallizable carbon fraction constituting about 2.5 grams was recovered.

This product was coated on one surface of a graphite mold, topped with Thornel 50 carbon cloth and then with another coating of the crystallizable carbon product. The mold was evacuated while gradually heating over a period of 57 minutes to about 600° C. (1113° F.). A ram pressure of 100 psi was applied after 62 minutes (temperature=1333° F.) and the temperature was gradually raised to about 2135°-2145° F. over the next 63 minutes and maintained there for an additional 26 minutes. The mold was opened and cooled. It was found that the carbon cloth had disintegrated but that the upper and lower sections were joined in areas where they were pressed together. Tensile testing showed a bond strength in the interface area of about 1220 psi. Optical magnification showed the bond interface to be indistinguishable from the adjoining graphite sections.

EXAMPLE 2

A crystallizable carbon fraction obtained from A240 pitch as in Example 1 was coated on the machined surface of a graphite piece and pressed together with another machined graphite surface. The assembly so formed was heated under vacuum for 10 minutes to 1320° F. A 200 lb. load was applied to the upper piece and further heating under vacuum from 1471° F. to 2048° F. ensued over a period of 79 minutes. After cooling, the pieces were found to be strongly bonded together.

A control assembly was processed in the same manner without the application of a load to the upper piece. The result was that no strong bond formed.

EXAMPLE 3

The general procedure of Example 2 was followed utilizing unprocessed pitch in place of the liquid crystalline pitch fraction. The processed assembly came apart while being held in a vise during a milling operation. The assembly showed some bonding but the bonding was too weak to withstand processing of the finished assembly.

This assembly was reheated under the same conditions as before without any improvement in bonding strength. This reheated assembly came apart during a cutting attempt with an abrasive wheel.

EXAMPLE 4

The general procedure of Example 2 was followed utilizing a 200 psi pressure during a heating period of 117 minutes during which the temperature rose from 554° F. to 2157° F. The heating temperature was above 1394° F. for about 92 of the total 117 minutes. A bond having the resulting strength of 1220 psi was obtained.

EXAMPLE 5

The general procedure of Example 4 was repeated utilizing a liquid crystalline pitch with 10 weight percent added tatalum carbide in place of all liquid crystalline pitch. The assembly was heat treated for a period of 66 minutes attaining a temperature of 2175° F. A bond having a strength of 720 psi was obtained.

The foregoing examples are exemplary rather than limiting. The appended claims are intended to encompass all modifications that would readily occur to those of ordinary skill in the art and are not to be limited except as expressly stated therein.

What is claimed is:

1. A process for bonding graphite pieces together wherein a graphitizable binder consisting essentially of a liquid crystalline component of pitch obtained by extracting an isotropic pitch with a hydrocarbon solvent to yield a solvent insoluble fraction which softens at about 240° C. and becomes very fluid at about 300° C. to about 500° C. is spread uniformly over at least one of the two graphite surfaces to be bonded together, the pieces are then joined and held in intimate contact and the entire assemblage is heated under vacuum or in an inert atmosphere to a temperature in the range of from about 700° C. to about 3000° C. under a pressure of from about 20 psi to about 1000 psi applied in a direction normal to the bond interface until bonding is effected.

2. A process according to claim 1 wherein the heating process is in two stages, the first stage being gradually heating the article to a temperature of about 550° C. and maintaining said temperature for a short time period followed by a second heating to a temperature in the range of from about 700° C. to about 3000° C.

3. A process according to claim 2 wherein the assembly is heated at a temperature of from about 1000° C. to about 1500° C. under a pressure of about 200 psi until bonding is effected.

4. A process according to claim 3 wherein the process is carried out in a vacuum.

5. A process according to claim 4 wherein the thickness of the binder is of the order of 1/16 inch and the assembly is wrapped prior to heating.

* * * * *